US011183054B1

(12) United States Patent
Kitagawa

(10) Patent No.: US 11,183,054 B1
(45) Date of Patent: Nov. 23, 2021

(54) INFORMATION PROCESSING DEVICE, INFORMATION PROCESSING SYSTEM, INFORMATION PROCESSING METHOD, AND STORAGE MEDIUM

(71) Applicant: TOYOTA JIDOSHA KABUSHIKI KAISHA, Toyota (JP)

(72) Inventor: Takashi Kitagawa, Kodaira (JP)

(73) Assignee: TOYOTA JIDOSHA KABUSHTKI KAISHA, Toyota (JP)

( * ) Notice: Subject to any disclaimer, the term of this patent is extended or adjusted under 35 U.S.C. 154(b) by 0 days.

(21) Appl. No.: 17/202,672

(22) Filed: Mar. 16, 2021

(30) Foreign Application Priority Data

Jun. 23, 2020 (JP) ............................ JP2020-107740

(51) Int. Cl.
*G08G 1/081* (2006.01)
*G08G 1/01* (2006.01)
*G06K 9/00* (2006.01)

(52) U.S. Cl.
CPC ........... *G08G 1/081* (2013.01); *G06K 9/0063* (2013.01); *G08G 1/0116* (2013.01); *G08G 1/0133* (2013.01); *G08G 1/0145* (2013.01)

(58) Field of Classification Search
CPC .......... B60R 2300/302; G06K 9/00798; G06K 9/0063; B60W 30/18154; B60W 40/04; G08G 1/081; G08G 1/0116; G08G 1/0133; G08G 1/0145
See application file for complete search history.

(56) References Cited

U.S. PATENT DOCUMENTS

2008/0010009 A1* 1/2008 Miyoshi .................. G01S 19/48 701/438
2010/0299000 A1* 11/2010 Nakamura ......... G06K 9/00798 701/1
2014/0358418 A1* 12/2014 Nakajima ............. B60W 30/09 701/301
2020/0282992 A1* 9/2020 Iwasaki ................. B60W 10/18

FOREIGN PATENT DOCUMENTS

JP 2015-125560 A 7/2015

* cited by examiner

*Primary Examiner* — Omeed Alizada

(74) *Attorney, Agent, or Firm* — Oblon, McClelland, Maier & Neustadt, L.L.P.

(57) ABSTRACT

In an information processing device, a determination unit determines whether a first distance from a position of a vehicle within a predetermined range of an intersection having a stop line to a road link of the intersection is shorter than a second distance from the position of the vehicle to a road link other than the road link of the intersection, based on vehicle information including information indicating the position of the vehicle and map information. An identification unit identifies whether the vehicle has stopped at the stop line, based on the vehicle information, when the first distance is determined to be shorter than the second distance.

4 Claims, 6 Drawing Sheets

1

INFORMATION PROCESSING DEVICE, INFORMATION PROCESSING SYSTEM, INFORMATION PROCESSING METHOD, AND STORAGE MEDIUM

CROSS-REFERENCE TO RELATED APPLICATION

This application claims priority to Japanese Patent Application No. 2020-107740 filed on Jun. 23, 2020, incorporated herein by reference in its entirety.

BACKGROUND

1. Technical Field

The present disclosure relates to a technique for identifying whether a vehicle has stopped at a stop line.

2. Description of Related Art

Japanese Unexamined Patent Application Publication No. 2015-125560 (JP 2015-125560 A) discloses a technology of detecting a vehicle running state of an own vehicle from after approaching an intersection to passing through the intersection, and determining whether the vehicle has temporarily stopped before a stop line, based on the detected vehicle running state.

SUMMARY

In the technique disclosed in JP 2015-125560 A, there is a possibility that it is determined whether a vehicle has temporary stopped, for a vehicle that has traveled on a road without a stop line near an intersection with a stop line and thus, there is room for improvement in the determination accuracy.

The present disclosure has been made in view of such a situation, and an object of the present disclosure is to provide a technique capable of improving the accuracy of identifying whether a vehicle has temporarily stopped at a stop line.

In order to solve the above problems, the information processing device according to a first aspect of the present disclosure includes: a determination unit that determines whether a first distance from a position of a vehicle within a predetermined range of an intersection having a stop line to a road link of the intersection is shorter than a second distance from the position of the vehicle to a road link other than the road link of the intersection, based on vehicle information including position information indicating the position of the vehicle and map information; and an identification unit that identifies whether the vehicle has stopped at the stop line, based on the vehicle information, when the first distance is determined to be shorter than the second distance.

A second aspect of the present disclosure is an information processing system. This information processing system includes: a server device; and an in-vehicle device that is mounted on a vehicle, that acquires vehicle information including position information indicating a position of the vehicle, and that transmits the vehicle information that is acquired to the server device. The server device has: an acquisition unit that acquires the vehicle information, a determination unit that determines whether a first distance from the position of the vehicle within a predetermined range of an intersection having a stop line to a road link of the intersection is shorter than a second distance from the position of the vehicle to a road link other than the road link of the intersection, based on the vehicle information that is acquired and map information; and an identification unit that identifies whether the vehicle has stopped at the stop line, based on the vehicle information that is acquired, when the first distance is determined to be shorter than the second distance.

A third aspect of the present disclosure is an information processing method. This method includes: a step of determining whether a first distance from a position of a vehicle within a predetermined range of an intersection having a stop line to a road link of the intersection is shorter than a second distance from the position of the vehicle to a road link other than the road link of the intersection, based on vehicle information including position information indicating the position of the vehicle and map information; and a step of identifying whether the vehicle has stopped at the stop line, based on the vehicle information, when the first distance is determined to be shorter than the second distance.

According to each aspect of the present disclosure, it is possible to improve the accuracy of identifying whether the vehicle is stopped at the stop line.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
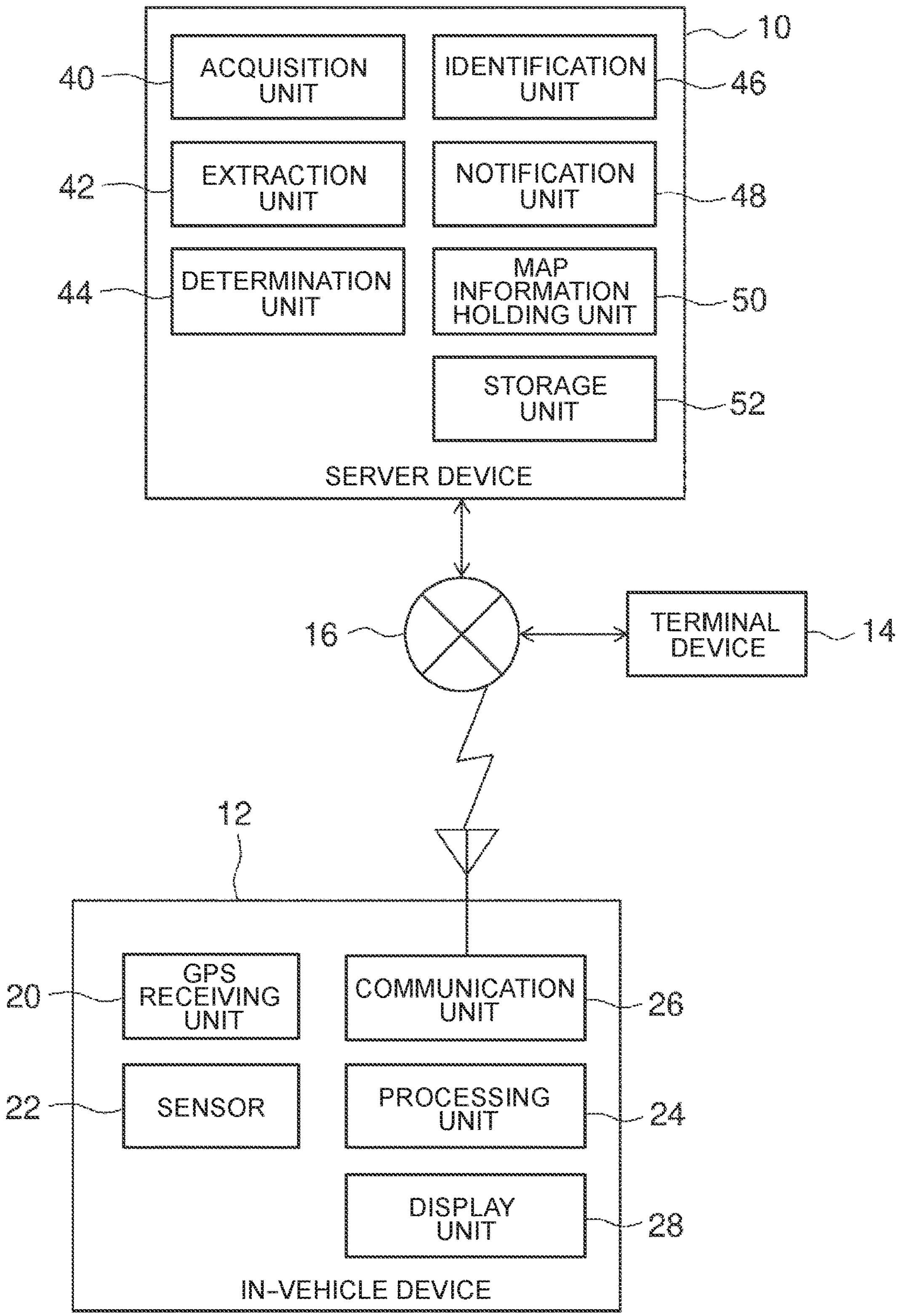
FIG. 1 is a block diagram of an information processing system according to an embodiment.

FIG. 1 is a block diagram of an information processing system 1 according to an embodiment. The information processing system 1 includes a server device 10, an in-vehicle device 12, and a terminal device 14. The in-vehicle device 12 is installed in a vehicle that is an automobile. The in-vehicle device 12 has a wireless communication function and is connected to a network 16 via a wireless base station or a wireless access point. Although not shown, the information processing system 1 can include a plurality of in-vehicle devices 12 each mounted on different vehicles.

The terminal device 14 is, for example, a personal computer or a smartphone, is owned by a family of a driver of the vehicle, etc., and is connected to the network 16 by wireless communication or wired communication. The server device 10 is connected to the network 16 and the server device 10 communicates with the terminal device 14 and the in-vehicle device 12 via the network 16. The server device 10 is installed in, for example, a data center and functions as an information processing device that processes data transmitted from the plurality of in-vehicle devices 12.

The in-vehicle device 12 includes a global positioning system (GPS) receiving unit 20, a sensor 22, a processing unit 24, a communication unit 26, and a display unit 28.

The GPS receiving unit 20 receives signals from GPS satellites and periodically derives a position of the vehicle. Position information of the vehicle includes latitude and longitude. The GPS receiving unit 20 outputs the position information of the vehicle to the processing unit 24. The derived time is attached to the position information.

The sensor 22 includes a speed sensor, periodically detects the speed of the vehicle, and outputs the detected speed information to the processing unit 24. The detected time is attached to the speed information.

The frequency at which the GPS receiving unit 20 derives the position and the frequency at which the sensor 22 detects the speed can be appropriately determined by an experiment or the like so that whether the vehicle has stopped at a stop line described below can be identified, and for example, the frequency may be several times to several tens of times per second. These frequencies may differ from each other.

The processing unit 24 acquires the position information from the GPS receiving unit 20, acquires the speed information from the sensor 22, and outputs the vehicle information including the position information and the speed information to the communication unit 26.

The communication unit 26 transmits the vehicle information received from the processing unit 24 to the server device 10. The frequency at which the communication unit 26 transmits the vehicle information is every time the traveling of the vehicle for one trip is completed or every predetermined period. Information for identifying the in-vehicle device 12 that is a transmission source is attached to the vehicle information to be transmitted. The display unit 28 displays various information according to a display control of the processing unit 24.

The server device 10 includes an acquisition unit 40, an extraction unit 42, a determination unit 44, an identification unit 46, a notification unit 48, a map information holding unit 50, and a storage unit 52. In terms of hardware, the configuration of the server device 10 can be realized by a CPU, a memory, and other LSI of any computer. Further, in terms of software, the configuration of the server device 10 is realized by a program loaded in the memory, etc. Here, functional blocks realized by the cooperation of hardware and software are described. Therefore, it is understood by those skilled in the art that the functional blocks can be realized by in various forms by means of hardware, software, and a combination of hardware and software.

The server device 10 periodically executes a driving behavior determination processing described below at a frequency of, for example, every trip or once a day to once a week. Further, the server device 10 executes the driving behavior determination processing for each in-vehicle device 12, that is, for each driver.

The acquisition unit 40 acquires the vehicle information transmitted from the in-vehicle device 12. The extraction unit 42 extracts a traveling path of the vehicle within a predetermined range of an intersection having a stop line, based on the position information included in the vehicle information acquired by the acquisition unit 40 and the map information held by the map information holding unit 50. The traveling path is composed of a plurality of vehicle positions and can also be called a history of changes in the vehicle positions.

Figure 2:
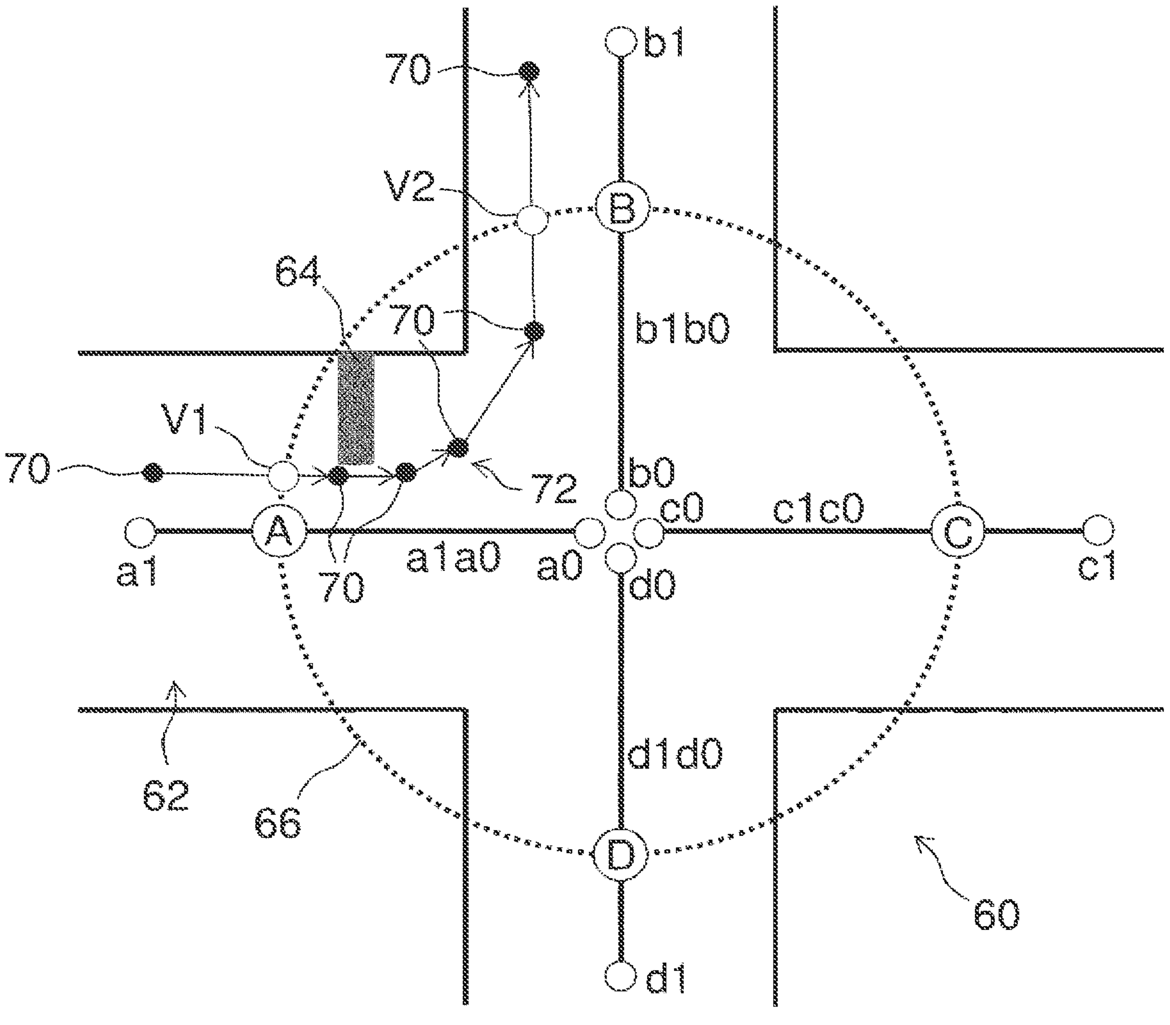
FIG. 2 is a diagram showing a traveling path of a vehicle passing through an intersection provided with a stop line.

FIG. 2 shows a traveling path 72 of the vehicle passing through an intersection 60 provided with a stop line 64. Generally, in a digital road map used for car navigation, etc., a road network is expressed by a node representing a feature point of a road and a link connecting the nodes to represent the shape of the road (hereinafter, also referred to as a road link). The link corresponds to a road section. The map information of the map information holding unit 50 includes data of the links and the nodes.

The intersection 60 in FIG. 2 is expressed by a link that has a link number a1*a*0 and that connects a node with a node number a1 and a node with a node number a0, a link that has a link number b1*b*0 and that connects a node with a node number b1 and a node with a node number b0, a link that has a link number c1*c*0 and that connects a node with a node number cl and a node with a node number c0, and a link that has a link number d1*d*0 and that connects a node with a node number dl and a node with a node number d0. Stop line information indicating that there is the stop line is attached to the link with the link number a1*a*0 representing the road 62 on which the stop line 64 is provided at the intersection 60.

The predetermined range is, for example, the range of a circle 66 having a predetermined radius from the center of the intersection 60. The predetermined radius may be the same at all intersections, or may be set for each intersection in accordance with the size of the intersection and may be set to, for example, 10 m to 20 m. The figure that defines the predetermined range is not limited to a circle, but may be a polygon, an ellipse, or the like. The figure that defines the predetermined range may be the same at all intersections, or may be set for each intersection according to the shape of the intersection.

The extraction unit 42 sets intersections A, B, C, and D between the circle 66 and each of the road links. Among the two intersections of a line connecting a plurality of vehicle positions 70 in the order of the derivation time and the circle 66, the extraction unit 42 sets the intersection on the vehicle position side in which the derivation time is early as V1 and sets the intersection on the vehicle position side in which the derivation time is late as V2. The extraction unit 42 identifies the road link on the intersection A closest to the intersection V1 as an approach road and the road link on the intersection B closest to the intersection V2 as an escape road.

When the stop line information is attached to the road link of the approach road, the extraction unit 42 determines that the vehicle has passed the stop line, and extracts the traveling path 72 of the vehicle within the predetermined range of the intersection 60 having the stop line 64. The extraction unit 42 does not extract the traveling path when the stop line information is not attached to the road link of the approach road. As a result, since it is possible to exclude the traveling path in which the vehicle has passed the intersection to which the stop line information is attached only to the road link other than the approach road, the accuracy of identifying whether the has temporarily stopped can be improved.

The extraction unit 42 extracts the traveling path of the vehicle within the predetermined range of the intersection for each of the one or more intersections in which the vehicle has passed the stop line.

The determination unit 44 determines whether the traveling path satisfies a predetermined determination condition, for each traveling path extracted by the extraction unit 42. The traveling path that satisfies the determination condition is a target for identifying whether the vehicle has temporarily stopped. A traveling path that does not satisfy the determination condition is excluded from the specific target of whether the vehicle has temporarily stopped. This is because, as described below, in the traveling path that does not satisfy the determination condition, the vehicle may not have actually passed through the stop line.

The determination condition includes at least one of the following first to sixth conditions. When the determination condition includes a plurality of conditions, it is assumed that the determination condition is satisfied when all of the plurality of conditions are satisfied. The conditions included in the determination condition can be appropriately determined by experiments. For example, in order to increase the probability that the traveling path satisfying the determination condition actually passes through the stop line as much as possible, the determination condition may include all of the first condition to the sixth condition.

First Condition

There is a possibility that an error occurs in the position of the vehicle derived by the GPS receiving unit 20 (hereinafter, also referred to as the vehicle position) due to the influence of weather conditions and the like, the derived vehicle position moves significantly to a position that is significantly different from the actual vehicle position. According to the first condition, the traveling path in which such a vehicle position is greatly moved is excluded.

The first condition is that the difference between the moving speed derived based on the vehicle position derived by the GPS receiving unit 20 at the intersection with the stop line and the vehicle speed detected by the sensor 22 at the intersection is less than a speed threshold value. The speed threshold value can be appropriately determined by an experiment, and may be, for example, about several tens of km/h to about 100 km/h.

The moving speed V(t) derived from the vehicle position at time t is expressed by the following equation (1).

$$V(t)=D(P(t),P(t-\Delta t))/\Delta t \tag{1}$$

D(a, b) is a function representing the distance between a position a and a position b. P(t) is a function representing the vehicle position derived by the GPS receiving unit 20 at time t. Δt is a predetermined time interval, for example, 500 milliseconds.

Figure 3:
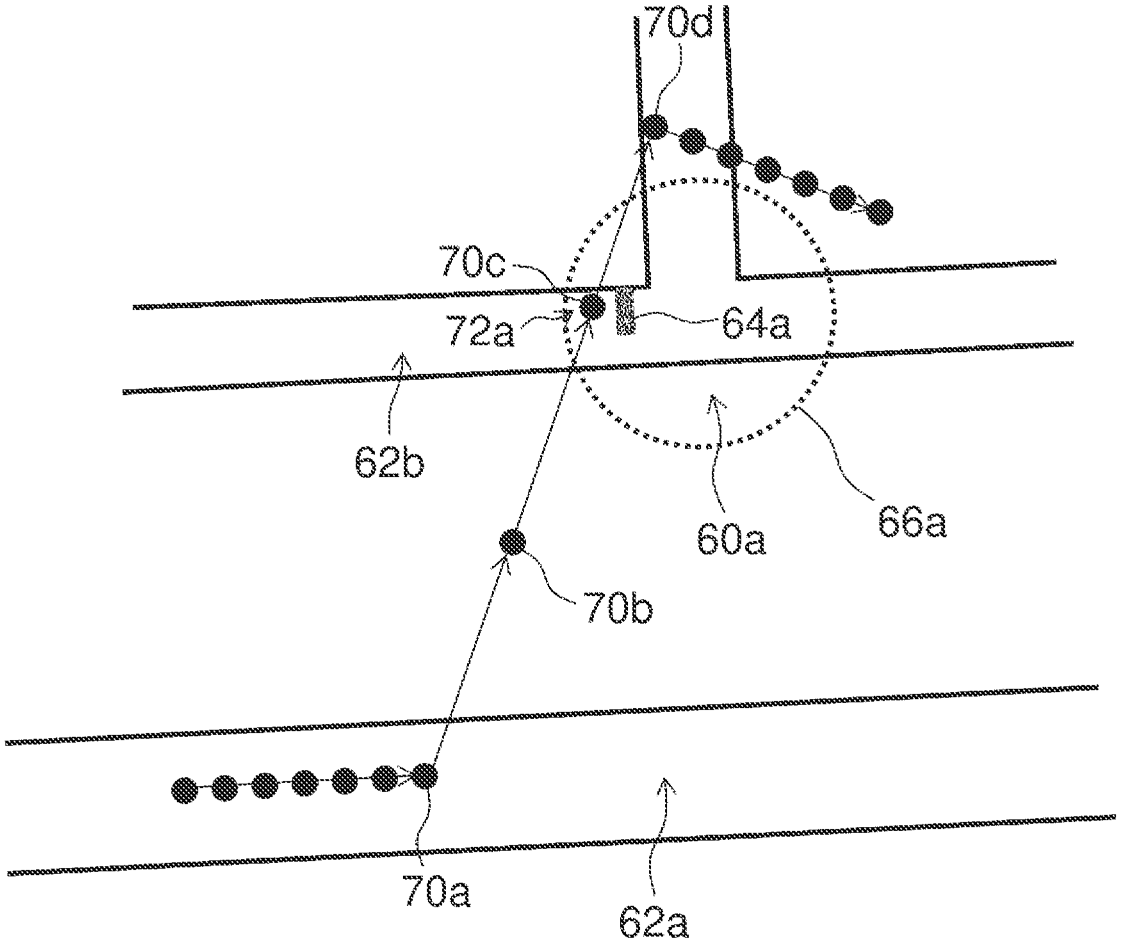
FIG. 3 is a diagram for describing a first condition of the embodiment.

FIG. 3 is a diagram for describing the first condition of the embodiment. Although a vehicle position 70*a* is on a road 62*a*, a vehicle position 70*b* moves significantly from the immediately preceding vehicle position 70*a* and is positioned outside the road 62*a*. A subsequent vehicle position 70*c* and a subsequent vehicle position 70*d* are also moved significantly. For example, when the derivation interval of the vehicle position is 0.1 second, it is assumed that the distance from the vehicle position 70*a* to the vehicle position 70*d* is several tens of meters or more.

A traveling path 72*a* is in the circle 66*a* at the intersection 60*a*. Since the stop line information of a stop line 64*a* is attached to the road link of an approach road 62*b*, the extraction unit 42 determines that the stop line has been passed, and extracts the traveling path 72*a* of the vehicle within the circle 66*a* of the intersection 60*a* including the stop line 64*a*. However, the first condition is not satisfied because the difference between the moving speed derived from the position of the vehicle at the intersection 60*a* and the vehicle speed based on the speed information is larger than the speed threshold value.

It is considered that the traveling path 72*a* does not actually pass through the stop line 64*a*. Due to the first condition is not being satisfied, the inaccurate traveling path 72*a* can be excluded from the target for identifying whether there is the temporary stop of the vehicle and thus, the accuracy of identifying whether there is the temporary stop can be improved.

This processing corresponds to the determination unit 44 determining whether the difference between the moving speed derived from the vehicle position information and the vehicle speed from the speed information, at the intersection with the stop line, is less than the speed threshold, based on the acquired vehicle information and the map information.

Second Condition

Figure 4:
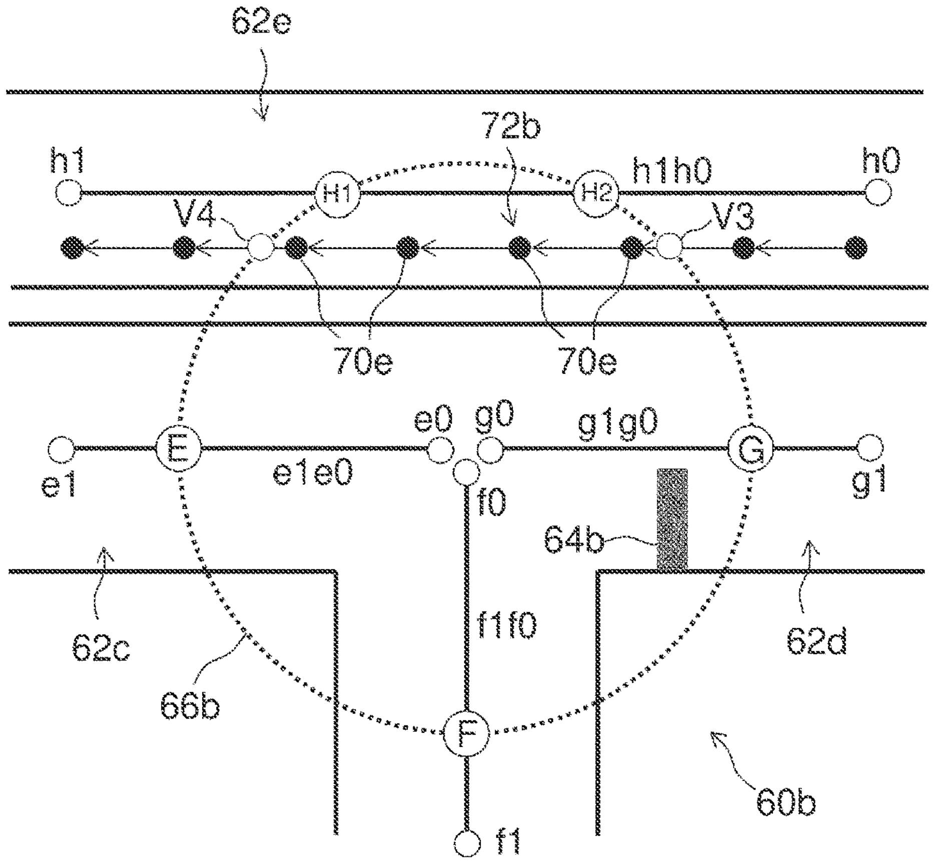
FIG. 4 is a diagram for describing a second condition of the embodiment.

FIG. 4 is a diagram for describing the second condition of the embodiment. There is another road 62*e* around an intersection 60*b* that is not connected to the intersection 60*b*. The other road 62*e* is parallel to a road 62*c* and a road 62*d* that are connected to the intersection 60*b*.

Since the traveling path 72*b* on the other road 62*e* passes through the inside of a circle 66*b* of the intersection 60*b* having a stop line 64*b*, the extraction unit 42 extracts the traveling path 72*b* as the traveling path of the vehicle in the circle 66*b* of the intersection 60*b*. Since this traveling path 72*b* does not actually pass through the stop line 64*b*, the traveling path 72*b* is excluded by the second condition.

The second condition is that a first distance from the position of the vehicle within the predetermined range of the intersection having the stop line to the road link of the intersection is shorter than a second distance from the position of the vehicle to the road link other than the road link of the intersection.

For example, the first distance is a straight line distance from an intersection V3 of the line connecting a plurality of vehicle positions 70*e* in the order of the derivation time and the circle 66*b* to the intersection G of a road link with a link number g1g0 and the circle 66*b*. The second distance is a straight line distance from the intersection V3 to an intersection H2 of a road link with a link number h1*h*0 and the circle 66*b*. The intersection V3 is an intersection on the vehicle position side at which the derivation time is early, and can be called the approach position of the vehicle to the intersection 60*b*.

The first distance may be a straight line distance from an intersection V4 of the line connecting the plurality of vehicle positions 70*e* in the order of the derivation time and the circle 66*b* to the intersection E of a road link with a link number e1*e*0 and the circle 66*b*. The second distance may be a straight line distance from the intersection V4 to an intersection H1 between the road link with the link number h1*h*0 and the circle 66*b*. The intersection V4 is an intersection on the vehicle position side at which the derivation time is late, and can be called the escape position from the vehicle intersection 60*b*.

The first distance may be the shortest distance from any vehicle position 70*e* in the circle 66*b* to the nearest road link with the link number g1g0 or the link number e1*e*0. The second distance may be the shortest distance from the same vehicle position 70*e* to the road link with the link number h1*h*0.

In the example of FIG. 4, the first distance is longer than the second distance, and the second condition is not satisfied. Thus, the traveling path 72*b* can be excluded from the target for identifying whether there is the temporary stop of the vehicle, and the accuracy of identifying whether there is the temporary stop can therefore be improved.

In contrast, although not shown, when there are travelling paths on the road 62*c* and the road 62*d* connected to the intersection 60*b*, the second condition is satisfied and thus, whether there is the temporary stop can be identified.

This processing corresponds to the determination unit 44 determining whether the first distance from the position of the vehicle within the predetermined range of the intersection having the stop line to the road link of the intersection is shorter than the second distance from the position of the vehicle to the road link other than the road link of the intersection, based on the vehicle information and map information.

Third Condition

The third condition is that the approach road and the escape road of the vehicle identified by the extraction unit 42 at the intersection having the stop line are different road links. The approach road and the escape road of the vehicle may be the same road link, such as when the vehicle makes a U-turn. That is, the road link closest to the identified intersection V1 and the road link closest to the identified intersection V2 may be the same. Since the reliability of such a traveling path may be low, this traveling is excluded. As a result, it is possible to improve the accuracy of identifying whether there is the temporary stop.

This processing corresponds to the determination unit 44 determining whether the approach road and the escape road of the vehicle at the intersection having the stop line are different road links, based on the acquired vehicle information and the map information.

Fourth Condition

The fourth condition is that the angle between the approach direction of the vehicle to the intersection with the stop line or the escape direction from the intersection, and the road link other than the approach road and the escape road connected to the intersection is equal to or more than a predetermined angle. The predetermined angle may be, for example, 20°, and can be appropriately determined by experiments.

For example, when the angle between the two road links configuring a Y-shaped road is less than 20°, it may not be possible to distinguish which road the vehicle actually traveled due to an error in the vehicle position. Thus, such a traveling path is excluded. As a result, it is possible to improve the accuracy of identifying whether there is the temporary stop.

This processing corresponds to the determination unit 44 determining whether the angle between the approach direction of the vehicle to the intersection with the stop line or the escape direction from the intersection, and the road link other than the approach road and the escape road connected to the intersection is equal to or more than a predetermined angle, based on the acquired vehicle information and the map information. For example, the determination unit 44 sets the direction from the vehicle position at which the derivation time is early before and after the intersection V1 identified by the extraction unit 42 to the vehicle position at which the derivation time is late as the approach direction of the vehicle to the intersection. Further, the determination unit 44 sets the direction from the vehicle position at which the derivation time is early before and after the intersection V2 identified by the extraction unit 42 to the vehicle position at which the derivation time is late as the escape direction of the vehicle from the intersection.

Fifth Condition

The fifth condition is that the traveling path is extracted at an intersection having the stop line in which there is no elevated road such as a highway or a bridge within the predetermined distance. The predetermined distance may be several tens of meters, such as 20 m, and can be appropriately determined by experiments.

For example, when there is the intersection with the stop line directly under the elevated road of the highway, it is possible that the vehicle is actually traveling on the highway and has not passed the stop line. Thus, such a traveling path of an intersection is excluded. As a result, it is possible to improve the accuracy of identifying whether there is the temporary stop.

This processing corresponds to the determination unit 44 determining whether the traveling path is extracted at the intersection having the stop line in which there is no elevated road within the predetermined distance, based on the acquired vehicle information and the map information. For example, when the elevated road information is attached to the road link within the predetermined distance of the intersection to be determined, the determination unit 44 extracts the traveling path at the intersection having the stop line in which there is the elevated road within the predetermined distance.

Sixth Condition

The sixth condition is that the traveling path is extracted at an intersection having a stop line in which there is no side road that merges diagonally. The side road that merges diagonally expresses a side road in which the angle between the link of the side road and the link of the road that joins is equal to or less than a predetermined angle. This predetermined angle may be the same as or different from the predetermined angle of the fourth condition. It is assumed that there is a stop line on such a side road and there is no stop line on the merged road. However, due to the error in the position of the vehicle, there is a possibility that it cannot be determined which of the side road and the merged road the vehicle is actually traveling on. Thus, the traveling path of the intersection in which such a side road exists is excluded. As a result, it is possible to improve the accuracy of identifying whether there is the temporary stop.

This processing corresponds to the determination unit 44 determining whether the traveling path is extracted at the intersection having the stop line in which there is no side road merging diagonally within the predetermined distance, based on the acquired vehicle information and the map information.

Only when the determination unit 44 determines that the traveling path satisfies the predetermined condition, the identification unit 46 identifies that the vehicle has temporarily stopped at the stop line related to the traveling path, based on the vehicle information acquired by the acquisition unit 40.

Specifically, the identification unit 46 determines that there is the temporary stop when the vehicle speed within the predetermined range of the intersection from which the traveling path satisfying the predetermined condition is extracted and the minimum speed of the vehicle speed within the predetermined time immediately before the vehicle enters the predetermined range of the intersection are below the stop threshold. When the minimum speed of these vehicle speeds is higher than the stop threshold value, the identification unit 46 specifies that there is no temporary stop. The predetermined time may be several seconds, for example, about 3 seconds. The stop threshold value may be several km/h, for example, about 4 km/h. These can be appropriately determined by experiments.

Figure 5:
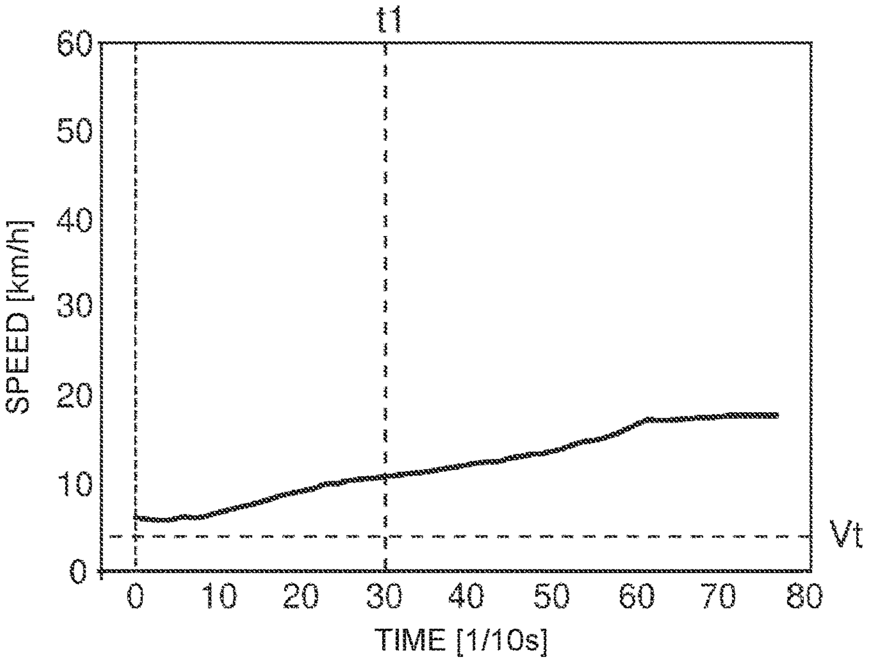
FIG. 5 is a diagram showing the relationship between the speed and time of the vehicle traveling through the intersection in FIG. 2.

FIG. 5 shows the relationship between the speed and time of the vehicle traveling at the intersection 60 of FIG. 2. The vehicle enters the circle 66 of the intersection 60 at a timing t1. The vehicle speed is higher than a stop threshold value Vt (=4 km/h) from 3 seconds before the timing t1 to the time of escaping the circle 66 about 4.5 seconds after the timing t1. Thus, the identification unit 46 specifies that there is no temporary stop.

Figure 6:
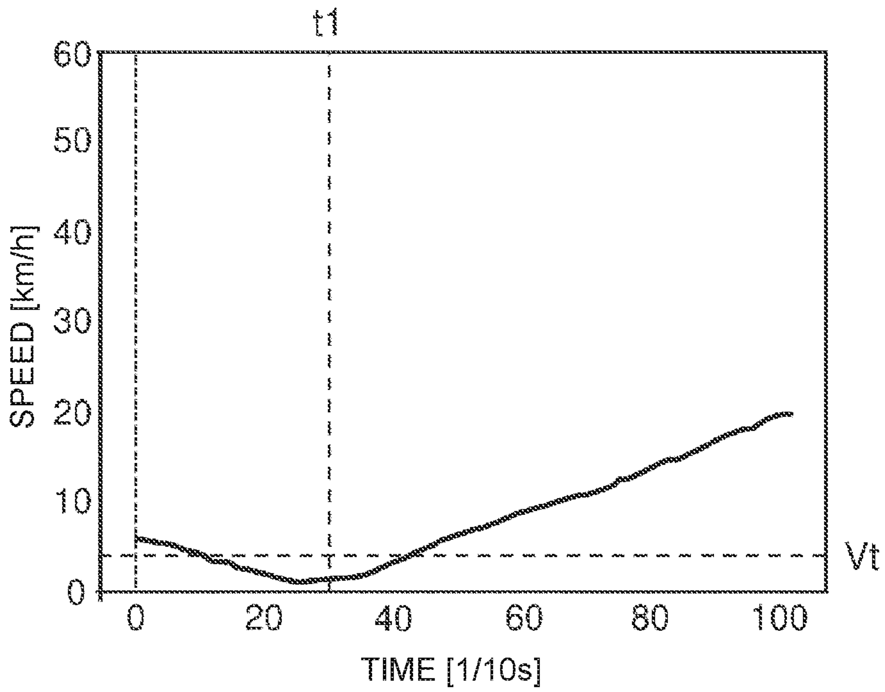
FIG. 6 is a diagram showing the relationship between the speed and time of the vehicle traveling through the intersection in FIG. 2.

FIG. 6 shows another example of the relationship between the speed and the time of the vehicle traveling at the intersection 60 of FIG. 2. The minimum speed of the vehicle speed from 3 seconds before the timing t1 when the vehicle enters the circle 66 of the intersection 60 to when the vehicle escapes the circle 66 about 7 seconds after the timing t1 is equal to or less than the stop threshold value Vt. Therefore, the identification unit 46 specifies that there is a temporary stop.

The identification unit 46 stores whether there is the identified temporary stop in the storage unit 52 in association with supplementary information such as a driver's ID, sensor data, and date/time information.

The notification unit 48 notifies at least one of the in-vehicle device 12 and the terminal device 14, of the identification result of whether there is the temporary stop stored in the storage unit 52. The notified identification result of whether there is the temporary stop is displayed on at least one of the display unit 28 (not shown) of the in-vehicle device 12 and the display unit of the terminal device 14. As a result, the driver and their family can be made aware of whether the driver has taken a driving action of not temporarily stopping at the stop line.

After traveling for one trip, the identification unit 46 may perform a driving diagnosis in accordance with the number of intersections for which it is identified that the vehicle has temporarily stopped among the plurality of intersections having the stop line that has been passed. For example, the identification unit 46 may score the ratio of the number of intersections at which the vehicle has temporarily stopped among the intersections having the stop line that the vehicle has passed and store the points in the storage unit 52. The notification unit 48 may notify at least one of the in-vehicle device 12 and the terminal device 14 of the points stored in the storage unit 52.

The specific result and the score of whether there is the temporary stop stored in the storage unit 52 can be used, for example, for calculating the insurance premium rate of automobile insurance.

Figure 7:
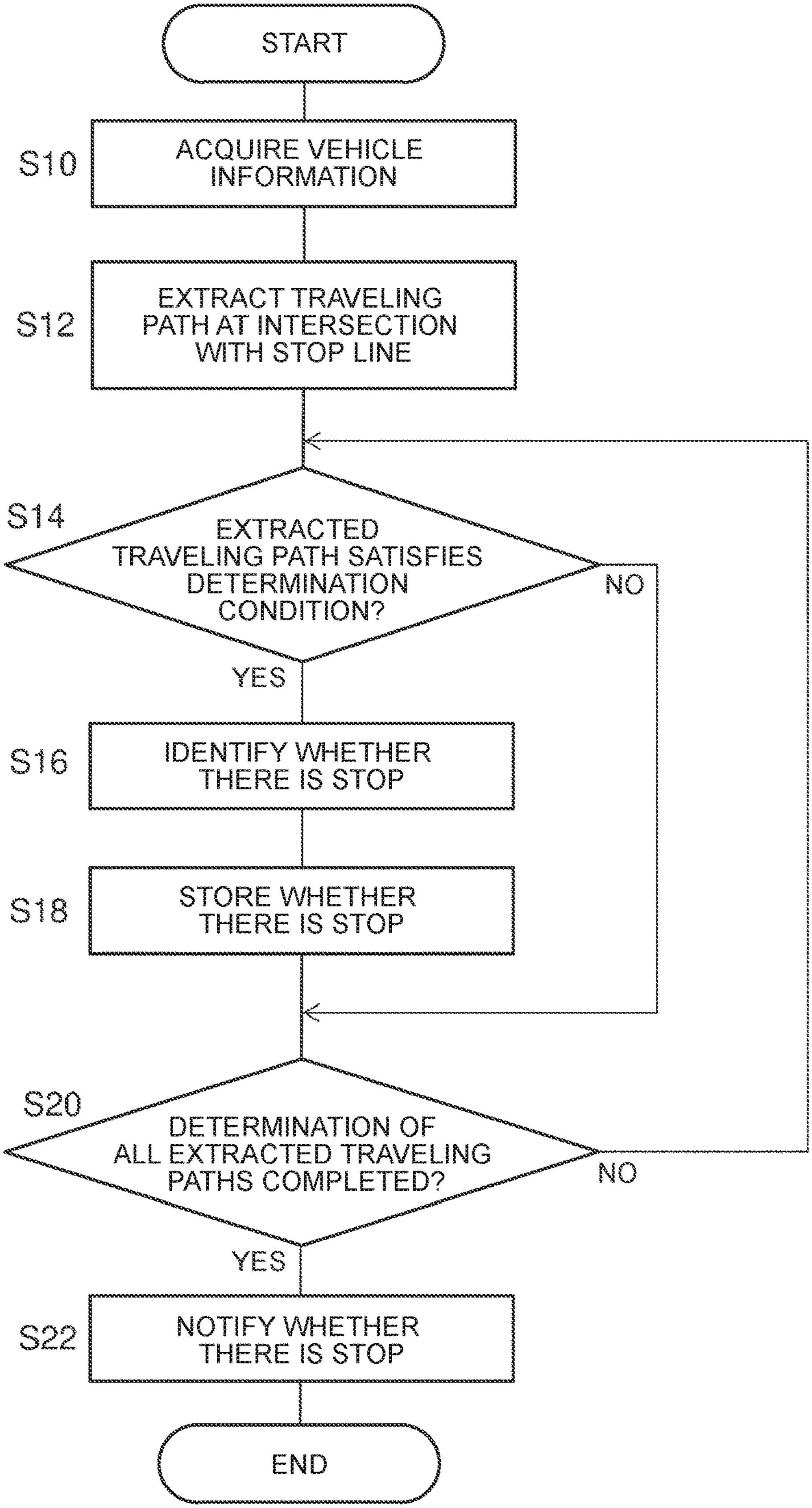
FIG. 7 is a flowchart illustrating a driving behavior determination processing performed by a server device shown in FIG. 1.

FIG. 7 is a flowchart showing a driving behavior determination processing performed by the server device 10 in FIG. 1. This processing is executed for each in-vehicle device 12. The acquisition unit 40 acquires the vehicle information transmitted from the in-vehicle device 12 (S10). The extraction unit 42 extracts the traveling path of the vehicle within the predetermined range of the intersection having the stop line (S12).

Subsequent processing of S14 to S18 is executed for each traveling path extracted in S12. When the extracted traveling path satisfies the determination condition (Y in S14), the identification unit 46 specifies whether there is a temporary stop (S16), and the storage unit 52 stores whether there is the identified temporary stop (S18), and if the determination of all the extracted travelling paths is not completed (N in S20), the processing returns to S14. When the extracted traveling path does not satisfy the determination condition (N in S14), the processing proceeds to S20. When the determination of all the extracted travelling paths is completed (Y in S20), the notification unit 48 notifies whether there is the temporary stop (S22), and ends the process.

According to the present embodiment, since whether the vehicle has temporarily stopped on the stop line is identified only when the predetermined condition is satisfied, the accuracy of identifying whether the vehicle has temporarily stopped can be improved.

The present disclosure has been described above based on the embodiment. The embodiment is just an example, and it is understood by a person skilled in the art that various modifications can be made in terms of combinations of the constituents and the processes and such modifications are also included in the scope of the present disclosure.

In the embodiment, the server device 10 executes the driving behavior determination process. However, the in-vehicle device 12 may execute the process. In this case, the in-vehicle device 12 further includes the acquisition unit 40, the extraction unit 42, the determination unit 44, the identification unit 46, the notification unit 48, the map information holding unit 50, and the storage unit 52, and the in-vehicle device 12 functions as an information processing device. In this case, the server device 10 may not be provided, or the server device 10 may collect the identification result of whether there is the temporary stop from each of the plurality of in-vehicle devices 12. According to this modification example, it is possible to improve the degree of freedom in the configuration of the information processing system 1.

In the embodiment, one server device 10 is provided. However, the server device 10 may be divided into two. That is, the server device 10 includes a first server device having the acquisition unit 40, a second server device having the extraction unit 42, the determination unit 44, the identification unit 46, the notification unit 48, the map information holding unit 50, and the storage unit 52. The first server device directly acquires the vehicle information transmitted from each of the plurality of in-vehicle devices 12, and provides the acquired vehicle information to the second server device. The second server device indirectly acquires vehicle information of a plurality of vehicles provided from the first server device, and executes the driving behavior determination processing based on the acquired vehicle information. According to this modification example, it is possible to improve the degree of freedom in the configuration of the information processing system 1.

Further, the map information holding unit 50 may hold the map information that excludes in advance, the intersections that do not satisfy the fifth condition or the sixth condition. As a result, it is possible to reduce the processing amount for extracting the traveling path of the vehicle at the intersection having the stop line.

In the embodiment, the driving behavior determination processing is periodically executed every trip or once a day to once a week. However, the driving behavior determination processing may be performed in real time every time the vehicle passes an intersection with a stop line. In this case, the in-vehicle device 12 transmits the vehicle information to the server device 10 in real time. In this modification, the driver can be notified in real time of the specific result of whether there is a temporary stop.

What is claimed is:

1. An information processing device comprising:

a determination unit that determines whether a first distance from a position of a vehicle within a predetermined range of an intersection having a stop line to a road link of the intersection is shorter than a second distance from the position of the vehicle to a road link other than the road link of the intersection, based on vehicle information including position information indicating the position of the vehicle and map information; and an identification unit that identifies whether the vehicle has stopped at the stop line, based on the vehicle information, when the first distance is determined to be shorter than the second distance.

2. An information processing system comprising:

a server device; and an in-vehicle device that is mounted on a vehicle, that acquires vehicle information including position information indicating a position of the vehicle, and that transmits the vehicle information that is acquired to the server device, wherein the server device includes an acquisition unit that acquires the vehicle information, a determination unit that determines whether a first distance from the position of the vehicle within a predetermined range of an intersection having a stop line to a road link of the intersection is shorter than a second distance from the position of the vehicle to a road link other than the road link of the intersection, based on the vehicle information that is acquired and map information, and an identification unit that identifies whether the vehicle has stopped at the stop line, based on the vehicle information that is acquired, when the first distance is determined to be shorter than the second distance.

3. A non-transitory storage medium storing instructions that are executable by one or more processors and that cause the one or more processors to perform functions comprising:

a step of determining whether a first distance from a position of a vehicle within a predetermined range of an intersection having a stop line to a road link of the intersection is shorter than a second distance from the position of the vehicle to a road link other than the road link of the intersection, based on vehicle information including position information indicating the position of the vehicle and map information; and a step of identifying whether the vehicle has stopped at the stop line, based on the vehicle information, when the first distance is determined to be shorter than the second distance.

4. An information processing method comprising:

a step of determining whether a first distance from a position of a vehicle within a predetermined range of an intersection having a stop line to a road link of the intersection is shorter than a second distance from the position of the vehicle to a road link other than the road link of the intersection, based on vehicle information including position information indicating the position of the vehicle and map information; and a step of identifying whether the vehicle has stopped at the stop line, based on the vehicle information, when the first distance is determined to be shorter than the second distance.

* * * * *

UNITED STATES PATENT AND TRADEMARK OFFICE

CERTIFICATE OF CORRECTION

PATENT NO. : 11,183,054 B1
APPLICATION NO. : 17/202672
DATED : November 23, 2021
INVENTOR(S) : Takashi Kitagawa It is certified that error appears in the above-identified patent and that said Letters Patent is hereby corrected as shown below:

On the Title Page

Item (73) should read:
-- (73) Assignee: TOYOTA JIDOSHA KABUSHIKI KAISHA, Toyota (JP) --

Signed and Sealed this
Thirty-first Day of May, 2022

Katherine Kelly Vidal

Katherine Kelly Vidal
*Director of the United States Patent and Trademark Office*